United States Patent
Yoon

(10) Patent No.: US 11,373,274 B1
(45) Date of Patent: Jun. 28, 2022

(54) METHOD FOR SUPER RESOLUTION IMAGING BASED ON DEEP LEARNING

(71) Applicant: SI Analytics Co., Ltd., Daejeon (KR)

(72) Inventor: Kwangjin Yoon, Daejeon (KR)

(73) Assignee: SI Analytics Co., Ltd., Daejeon (KR)

( * ) Notice: Subject to any disclaimer, the term of this patent is extended or adjusted under 35 U.S.C. 154(b) by 0 days.

(21) Appl. No.: 17/688,564

(22) Filed: Mar. 7, 2022

(30) Foreign Application Priority Data

Mar. 17, 2021 (KR) .................. 10-2021-0034415
Dec. 6, 2021 (KR) .................. 10-2021-0172526

(51) Int. Cl.
*G06T 3/40* (2006.01)

(52) U.S. Cl.
CPC .......... *G06T 3/4046* (2013.01); *G06T 3/4007* (2013.01); *G06T 3/4053* (2013.01)

(58) Field of Classification Search
CPC ... G06T 3/4046; G06T 3/4053; G06T 3/4007; G06T 2207/20084; G06T 2207/20081; G06N 3/02–088
See application file for complete search history.

(56) References Cited

U.S. PATENT DOCUMENTS

| | | |
|---|---|---|
| 2018/0268284 A1 | 9/2018 | Ren et al. |
| 2019/0138838 A1 | 5/2019 | Liu et al. |
| 2021/0004935 A1 | 1/2021 | Yao et al. |

FOREIGN PATENT DOCUMENTS

| | | |
|---|---|---|
| JP | 2018151747 A | 9/2018 |
| JP | 2021502644 A | 1/2021 |
| KR | 1020180105556 A | 9/2018 |
| KR | 102059529 B1 | 12/2019 |
| KR | 102134405 B1 | 7/2020 |
| KR | 102169242 B1 | 10/2020 |
| KR | 102170547 B1 | 10/2020 |

OTHER PUBLICATIONS

Bulat, Adrian, Jing Yang, and Georgios Tzimiropoulos. "To learn image super-resolution, use a GAN to learn how to do image degradation first." arXiv preprint arXiv:1807.11458v1 (2018). (Year: 2018).*

Sajjadi, Mehdi SM, Bernhard Schölkopf, and Michael Hirsch. "EnhanceNet: Single Image Super-Resolution Through Automated Texture Synthesis." arXiv preprint arXiv:1612.07919v2 (2017). (Year: 2017).*

(Continued)

*Primary Examiner* — Geoffrey E Summers
(74) *Attorney, Agent, or Firm* — Umberg Zipser LLP; Ryan Dean

(57) ABSTRACT

According to an exemplary embodiment of the present disclosure, a method of super resolution imaging based on deep learning performed by a computing device is disclosed. The method may include: receiving a first image and a second image having low resolution compared to the first image; training a first model so as to generate a low-resolution image corresponding to the second image based on the first image; and training a second model so as to generate a high-resolution image corresponding to the first image based on an output image of the first model. In this case, contents of the first image may not correspond to contents of the second image.

10 Claims, 7 Drawing Sheets

(56) References Cited

OTHER PUBLICATIONS

Chen, Honggang, et al. "Real-world single image super-resolution: A brief review." Information Fusion 79 (2022): 124-145. (Year: 2021).*
Gondal, Muhammad Waleed, Bernhard Schölkopf, and Michael Hirsch. "The unreasonable effectiveness of texture transfer for single image super-resolution." European Conference on Computer Vision. Springer, Cham, 2018. (Year: 2019).*
Ma, Xin, et al. "Exploiting Style and Attention in Real-World Super-Resolution." arXiv preprint arXiv:1912.10227v2 (2019). (Year: 2020).*
Pan, Zhaoqing, et al. "Loss functions of generative adversarial networks (GANs): opportunities and challenges." IEEE Transactions on Emerging Topics in Computational Intelligence 4.4 (2020): 500-522. (Year: 2020).*
Adrian Bulat et al., "To learn image super-resolution, use a GAN to learn how to do image degradation first," Computer Vision Laboratory, University of Nottingham, U.K., arXiv:1807.11458v1 [cs.CV] Jul. 30, 2018; 16 pages.
Dong Gong et al., "Learning to Zoom-in via Learning to Zoom-out: Real-world Super-resolution by Generating and Adapting Degradation," School of Computer Science and Engineering, Northwestern Polytechnical University, China, arXiv:2001.02381v1 [eess.IV] Jan. 8, 2020; 14 pages.
Jun-Yan Zhu et al., "Unpaired Image-to-Image Translation using Cycle-Consistent Adversarial Networks," Berkeley AI Research (BAIR) laboratory, UC Berkeley, arXiv:1703.10593v7 [cs.CV] Aug. 24, 2020; 18 pages.

\* cited by examiner

METHOD FOR SUPER RESOLUTION IMAGING BASED ON DEEP LEARNING

CROSS-REFERENCE TO RELATED APPLICATIONS

This application claims priority to and the benefit of Korean Patent Application No. 10-2021-0034415 filed in the Korean Intellectual Property Office on Mar. 17, 2021, the entire contents of which are incorporated herein by reference.

TECHNICAL FIELD

The present disclosure relates to an image processing method, and more particularly, to a deep learning technology which performs super resolution imaging by using a low-resolution image and a high-resolution image that are unpaired.

BACKGROUND ART

Super resolution imaging relates to a technique for reconstructing a low-resolution image to a high-resolution image. With the development of deep learning technology, the technical performance of super-resolution imaging is also greatly improved. Most of the deep learning-based super-resolution imaging methods currently being developed are performed by training a model using a paired image set. The paired image set is a set of images that include corresponding contents and are correlated with each other, and refers to an image set that can be naturally matched or combined.

However, since it is very difficult to obtain a paired image set according to a real domain environment, there is a disadvantage in that training a model using a paired image set is impractical. For example, in the case of satellite imagery, it is not easy to obtain a paired image set compared to other domains due to numerous environmental and technical factors that affect the acquisition of satellite images. Therefore, in the case of satellite imagery, the existing deep learning-based super-resolution imaging method cannot be applied as it is, and even if it is applied, its performance cannot be guaranteed. Since it is difficult to apply the existing method in an environment where paired image sets are insufficient, there is an increasing demand in the art for a technology for performing super-resolution imaging even with an unpaired image set.

Korean Patent No. 10-2169242 (Oct. 19, 2020) discloses a machine learning method and apparatus for reconstructing a super-resolution image.

SUMMARY OF THE INVENTION

The present disclosure has been conceived in response to the foregoing background art, and has been made in an effort to provide a method of performing super resolution imaging by using a low-resolution image and a high-resolution image that are unpaired based on deep learning.

In order to solve the foregoing object, an exemplary embodiment of the present disclosure discloses a method of super resolution imaging based on deep learning performed by a computing device. The method may include: receiving a first image and a second image having low resolution compared to the first image; training a first model so as to generate a low-resolution image corresponding to the second image based on the first image; and training a second model so as to generate a high-resolution image corresponding to the first image based on an output image of the first model. In this case, contents of the first image may not correspond to contents of the second image.

In an alternative exemplary embodiment, the first model may include: a first-1 neural network which receives the first image and generates a low-resolution image corresponding to the second image; a first-2 neural network which discriminates the low-resolution image generated through the first-1 neural network by using the second image as Ground Truth (GT); and a first-3 neural network which adjusts factors related to a texture of the low-resolution image generated through the first-1 neural network by using the second image as the GT.

In the alternative exemplary embodiment, the first model may further include an interpolation module for down sampling the first image.

In the alternative exemplary embodiment, the first model may be trained based on a first-1 loss function that calculates a pixel distance between the first image down-sampled through the interpolation module and the low-resolution image generated through the first-1 neural network.

In the alternative exemplary embodiment, the first model may be trained based on a first-2 loss function that calculates a difference in a gram matrix between the low-resolution image generated through the first-1 neural network and the second image.

In the alternative exemplary embodiment, the gram matrix may be calculated based on a feature value derived from an intermediate layer of the first-2 neural network.

In the alternative exemplary embodiment, the second model may include: a second-1 neural network which receives an output image of the first model and generates a high-resolution image corresponding to the first image; a second-2 neural network which discriminates the high-resolution image generated through the second-1 neural network by using the first image as the GT; and a second-3 neural network which adjusts factors related to a texture of the high-resolution image generated through the second-1 neural network by using the first image as the GT.

In the alternative exemplary embodiment, the second model may be trained based on a second-1 loss function that calculates a pixel distance between the first image and the high-resolution image generated through the second-1 neural network.

In order to solve the foregoing object, another exemplary embodiment of the present disclosure discloses a method of super resolution imaging based on deep learning performed by a computing device. The method may include: generating a low-resolution image corresponding to a second image based on a high-resolution image compared to the second image by using a pre-trained first model; and generating a high-resolution image corresponding to the first image based on an output image of the first model by using a pre-trained second model. In this case, contents of the first image may do not correspond to contents of the second image.

In order to solve the foregoing object, another exemplary embodiment of the present disclosure discloses a computer program stored in a computer readable storage medium. When the computer program is executed by one or more processors, the computer program performs following operations for performing super resolution imaging based on deep learning, the operations comprising: receiving a first image and a second image of low resolution compared to the first image; training a first model so as to generate a low-resolution image corresponding to the second image based on the first image; and training a second image so as to generate a high-resolution image corresponding to the first image based on an output image of the first model. In this case, contents of the first image may do not correspond to contents of the second image.

In order to solve the foregoing object, another exemplary embodiment of the present disclosure discloses a computing device performing super resolution imaging based on deep learning. The device may include: a processor including at least one core; a memory including program codes executable in the processor; and a network unit configured to receive an image, in which the processor may train the first model so as to generate a low-resolution image corresponding to the second image based on a high-resolution first image compared to the second image, and train the second model so as to generate a high-resolution image corresponding to the first image based on an output image of the first model. In this case, contents of the first image may do not correspond to contents of the second image.

In order to solve the foregoing object, another exemplary embodiment of the present disclosure discloses a computer-readable recording medium in which a data structure corresponding to a parameter of a neural network of which at least a part is updated during a training process is stored. An operation of the neural network may be at least partially based on the parameter, and the training process may include: receiving a first image and a second image having low resolution compared to the first image; training a first model so as to generate a low-resolution image corresponding to the second image based on the first image; and training the second model so as to generate a high-resolution image corresponding to the first image based on an output image of the first model. In this case, contents of the first image may do not correspond to contents of the second image.

The present disclosure may provide a method of super resolution imaging by using a low-resolution image and a high-resolution image that are unpaired based on deep learning.

DETAILED DESCRIPTION

Figure 1:
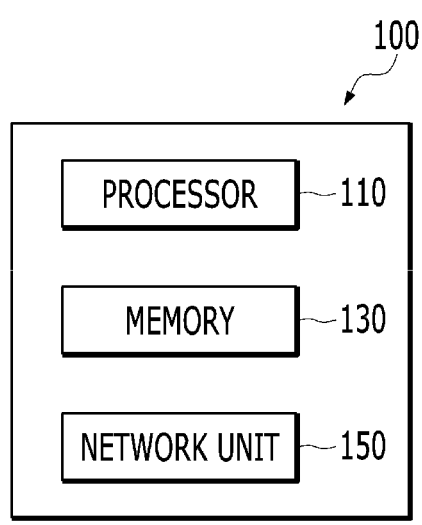
FIG. 1 is a block diagram illustrating a computing device performing super resolution imaging based on deep learning according to an exemplary embodiment of the present disclosure.

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

It should be understood that a term "include" and/or "including" means that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear in context that a single form is indicated, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, a network function, an artificial neural network, and a neural network may be interchangeably used.

On the other hand, the terms "image", "image" or "image data" used throughout the detailed description and the claims of the present disclosure refer to multidimensional data composed of discrete image elements (for example, pixels in a two-dimensional image), and in other words, the terms refer to a visible object (for example, displayed on a video screen) or a digital representation of the object (for example, a file corresponding to the pixel output).

The term "$N^{th}$ (N is a natural number)" expressed throughout the detailed description and claims of the present disclosure may be understood as an expression used to distinguish the constituent elements of the invention in terms of a functional or structural point of view. The term "$N^{th}$" may be understood as a term used to distinguish and express constituent elements according to a predetermined criterion. For example, in the present disclosure, two models that are based on the same neural network structure but perform different functions due to differences in input/output data, and the like may be distinguished through an expression called an $N^{th}$ configuration, like a first model and a second model. In addition, two models that perform the same function but are based on different neural network structures may also be distinguished through the expression of an $N^{th}$ configuration like a first model and a second model. However, this is only an example, and the term "$N^{th}$" may be used to distinguish constituent elements according to various criteria from various viewpoints.

The term "$N^{th}$-M are natural numbers)" expressed throughout the detailed description and the claims of the present disclosure distinguishes constituent elements associated with a specific configuration (that is, an $N^{th}$ configuration) of the invention from each other in terms of a functional or structural point of view. For example, the constituent elements of the neural network unit included in a first model may be distinguished through the expression of an $N^{th}$-M configuration, such as a first-1 module (or neural network), a first-2 module (or neural network), and a first-3 module (or neural network) according to functions or structures. However, this is only an example, and the term "$N^{th}$-M" may be used to distinguish constituent elements according to various criteria from various viewpoints.

FIG. 1 is a block diagram illustrating a computing device performing super resolution imaging based on deep learning according to an exemplary embodiment of the present disclosure.

The configuration of a computing device 100 illustrated in FIG. 1 is merely a simplified example. In the exemplary embodiment of the present disclosure, the computing device 100 may include other configurations for performing a computing environment of the computing device 100, and only some of the disclosed configurations may also configure the computing device 100.

The computing device 100 may include a processor 110, a memory 130, and a network unit 150.

The processor 110 may be formed of one or more cores, and may include a processor, such as a central processing unit (CPU), a general purpose graphics processing unit (GPGPU), and a tensor processing unit (TPU) of the computing device, for performing a data analysis and deep learning. The processor 110 may read a computer program stored in the memory 130 and process data for machine learning according to an exemplary embodiment of the present disclosure. According to the exemplary embodiment of the present disclosure, the processor 110 may perform calculation for training a neural network. The processor 110 may perform a calculation, such as processing of input data for training in Deep Learning (DL), extraction of a feature from input data, an error calculation, and updating of a weight of the neural network by using backpropagation, for training the neural network. At least one of the CPU, GPGPU, and TPU of the processor 110 may process training of a network function. For example, the CPU and the GPGPU may process training of the network function and data classification by using a network function together. Further, in the exemplary embodiment of the present disclosure, the training of the network function and the data classification by using a network function may be processed by using the processors of the plurality of computing devices together. Further, the computer program executed in the computing device according to the exemplary embodiment of the present disclosure may be a CPU, GPGPU, or TPU executable program.

According to an exemplary embodiment of the present disclosure, the processor 110 may perform super resolution imaging based on an unpaired image set. In this case, the unpaired image set may be understood to include contents that do not correspond to each other and include a plurality of images independent of each other. The unpaired image set may be understood as an image set in which natural feature matching or combination is difficult due to non-corresponding contents. For example, the unpaired image set may include satellite images obtained by photographing different zones. The processor 110 may perform super resolution imaging that converts a low-resolution image to a high-resolution image by using a deep learning model based on an image set consisting of satellite images obtained by photographing different zones.

The processor 110 may train a deep learning model for performing the super resolution imaging based on the plurality of images which are unpaired and have difference in resolution. The processor 110 may train the deep learning model which performs a super resolution image based on a low-resolution image and a high-resolution image in which the contents do not correspond to each other. In this case, the resolution of the plurality of images may also be distinguished according to resolution of an absolute criteria generally determined according to the number of pixels, and may also be distinguished based on relative difference. For example, the processor 110 may train the deep learning model which performs the super resolution imaging based on the low-resolution image and the high-resolution image which have the contents that do not correspond to each other. The deep learning model trained by the processor 110 may include a plurality of Generative Adversarial Network (GAN)-based models. The plurality of GAN-based models included in the deep learning model may be connected by end-to-end, and trained to generate a super-resolution image based on a low-resolution satellite image and a high-resolution image.

According to the exemplary embodiment of the present disclosure, the memory 130 may store a predetermined type of information generated or determined by the processor 110 and a predetermined type of information received by a network unit 150.

According to the exemplary embodiment of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device 100 may also be operated in relation to web storage performing a storage function of the memory 130 on the Internet. The description of the foregoing memory is merely illustrative, and the present disclosure is not limited thereto.

The network unit 150 according to the exemplary embodiment of the present disclosure may use a predetermined form of a publicly known wire/wireless communication system.

The network unit 150 may receive images from an external system. For example, the network unit 150 may receive ground-captured images from a satellite system, an air system, and the like. The ground-captured images may be data for training or data for inferring of the neural network model. Further, the ground-captured images may also be paired images, and may not be unpaired images. The ground-captured images may include all of an electro-optic image, a Synthetic Aperture Radar (SAR) image, and the like photographed through a satellite, an aircraft, and the like. The ground-captured images are not limited to the foregoing example, and may be variously configured within the range that those skilled in the art can understand.

The network unit 150 may transceive information and data processed by the processor 110 with other terminals through communication. For example, the network unit 150 may provide the super resolution image generated by the processor 110 to a client (for example, another server and a user terminal).

In the meantime, the computing device 100 according to the exemplary embodiment of the present disclosure is a computing system for transceiving information with the client through communication and may be a server. In this case, the client may be a predetermined type of terminal accessible to the server. For example, the computing device 100 that is the server may receive the unpaired ground-captured images from the artificial satellite system and performs the super resolution imaging, and provide the super resolution image generated as a result of the operation to the server or the user terminal for an image analysis (for example, an object detection).

In an additional exemplary embodiment, the computing device 100 may also include a predetermined form of terminal which receives data resources generated in a predetermined server and performs additional information processing.

Figure 2:
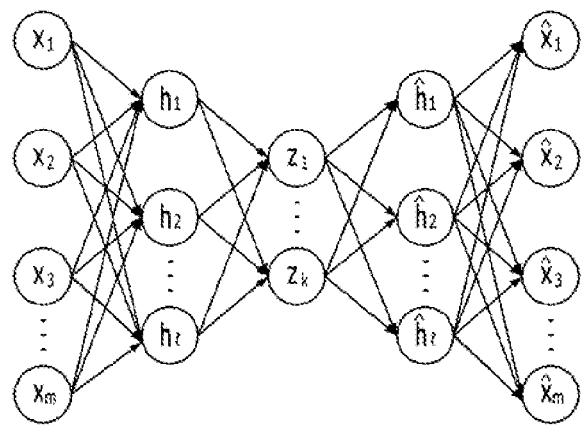
FIG. 2 is a schematic diagram illustrating a network function according to the exemplary embodiment of the present disclosure.

FIG. 2 is a schematic diagram illustrating a network function according to the exemplary embodiment of the present disclosure.

The model according to the exemplary embodiment of the present disclosure may include a neural network for performing super-resolution imaging. Throughout the present specification, a nerve network, a network function, and the neural network may be used with the same meaning. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer based on distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the exemplary embodiment of the present disclosure, the number of nodes of the input layer may be the same as the number of nodes of the output layer, and the neural network may be in the form that the number of nodes decreases and then increases again from the input layer to the hidden layer. Further, in the neural network according to another exemplary embodiment of the present disclosure, the number of nodes of the input layer may be smaller than the number of nodes of the output layer, and the neural network may be in the form that the number of nodes decreases from the input layer to the hidden layer. Further, in the neural network according to another exemplary embodiment of the present disclosure, the number of nodes of the input layer may be larger than the number of nodes of the output layer, and the neural network may be in the form that the number of nodes increases from the input layer to the hidden layer. The neural network according to another exemplary embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a restricted Boltzmann machine (RBM), a deep belief network (DBN), a Q network, a U network Siamese network, and the like. The foregoing description of the deep neural network is merely illustrative, and the present disclosure is not limited thereto.

In the exemplary embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of the nodes of the network during the learning process, a method using a bath normalization layer, and the like may be applied.

Figure 3:
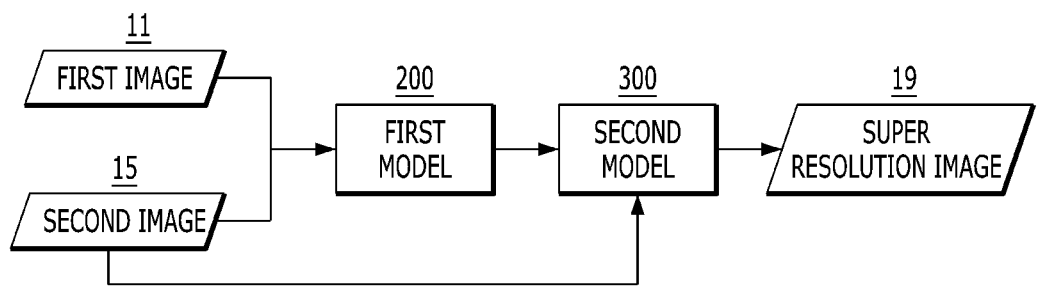
FIG. 3 is a block diagram illustrating a super resolution image generating process of the computing device according to the exemplary embodiment of the present disclosure.

FIG. 3 is a block diagram illustrating a super resolution image generating process of the computing device according to the exemplary embodiment of the present disclosure.

Referring to FIG. 3, the processor 110 of the computing device 100 according to the exemplary embodiment of the present disclosure may train a deep learning model for super resolution imaging based on a first image 11, and a second image 15 of lower resolution compared to the first image 11.

In this case, a content of the first image 11 and a content of a second image 15 may not correspond to each other. For example, the first image 11 may include a satellite image obtained by capturing a specific region. The second image 15 is a satellite image obtained by capturing a different region from that of the first image, and may include an image of relatively low resolution compared to the first image. As such, the first image 11 and the second image 15 may be different images in which the elements, such as an object, a background, and a style, making up the contents are different. A resolution difference between the first image 11 and the second image 15 may also be based on a relative comparison between the images 11 and 15, and may also be based on a resolution criteria (for example, High Definition (HD)) determined according to the number of pixels.

The processor 110 may train a first model 200 which performs resolution conversion of the image based on the first image 11 and the second image 15. The processor 110 may train the first model 200 so as to generate an image of low resolution corresponding to the second image 15 by inputting the first image 11 and the second image 15 to the first model 200. For example, the processor 110 may train the first model 200 so as to degrade the resolution of the first image 11 based on the second image 15 as Ground Truth (GT). The training of the first model 200 is performed so as to well predict a function for degrading the resolution expressed by Equation 1 below, and may be understood by those skilled in the art.

$$y=(x*k)\downarrow_s+n \quad \text{[Equation 1]}$$

Herein, k refers to kernel, n refers to noise, and s refers to a scale factor. Since the values of k and n cannot be known, the first model 200 performs an operation corresponding to the foregoing function by making $(x*k)\downarrow_s$ correspond to a deep-stacked neural network, so that the processor 110 may train the first model 200 so as to adjust the resolution of the first image 11. That is, the first model 200 may be trained so as to convert the first image 11 to have the low resolution corresponding to the second image 15 based on the first image 11 and the second image 15. In this case, the content characteristics of the first image 11 and the second image 15 do not correspond to each other, so that it is difficult to use a model having a general neural network structure that matches the characteristic by using the second image 15 as GT as the first model 200. Therefore, in order to solve the foregoing problem, as the first model 200 of the present disclosure, the GAN-based model which uses the first image 11 as an input of a generator and the second image 15 as GT of a discriminator may be used.

The processor 110 may train a second model 300 performing resolution conversion of an image based on an output image of the first model 200 and the first image 11. The processor 110 may train the second model 300 so as to generate an image of high resolution corresponding to the first image 11 by inputting the output image of the first model 200 and the first image 11 to the second model 300. For example, the processor 110 may train the second model 300 so as to improve the resolution of the output image of the first model 200 by using the first image 11 as GT. That is, the second model 300 may be trained so as to convert the low-resolution image corresponding to the second image 15 based on the first image 11 and the output image of the first model 200. In this case, as the second model 300 of the present disclosure, the GAN-based model using the output image of the first model 200 as an input of a generator and the first image 11 as GT of a discriminator.

The processor 110 may perform the super resolution imaging on the unpaired image by using the first model 200 and the second model 300 pre-trained as described above. The processor 110 may generate a super-resolution image that is paired with the low-resolution image based on the high-resolution image that is unpaired with the low-resolution image through the pre-trained first model 200 and second model 300. For example, when it is assumed that the first image 11 is the high-resolution input image and the second image 15 is a low resolution GT image that is unpaired with the first image in FIG. 3, in order generate a super-resolution image paired with the second image 15, the processor 110 may use the first model 200 and the second model 300 pre-trained as described above. The first model 200 may generate the low-resolution image corresponding to the second image by receiving the first image 11. The second model 300 may generate a super-resolution image 19 of resolution corresponding to that of the first image 11 by receiving the low-resolution image generated by the first model 200. As described above, through the operation of the processor 110 utilizing the first model 200 and the second model 300, the super resolution imaging of improving the resolution of the low-resolution image may be effectively performed even with the unpaired image set.

Figure 4:
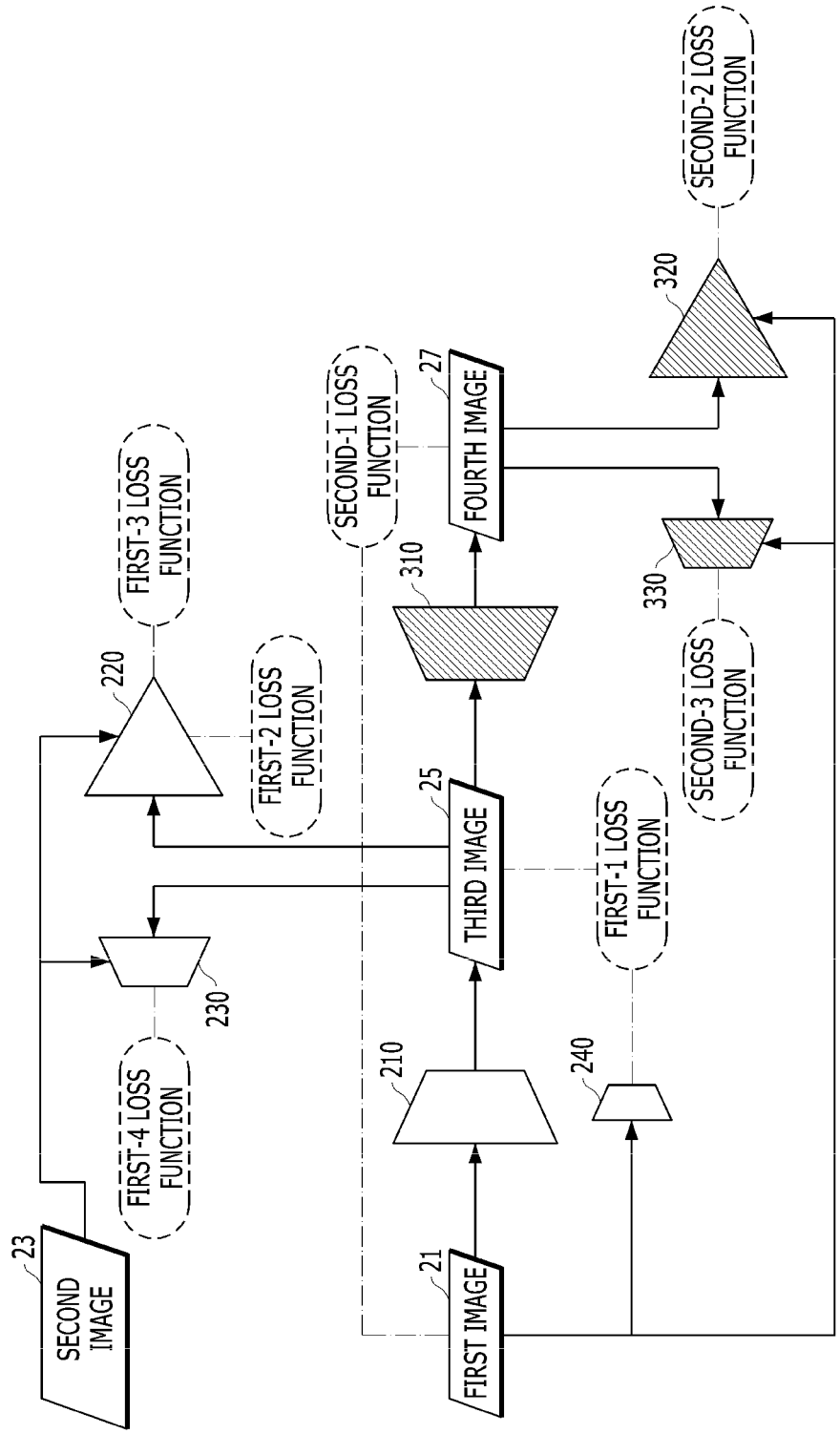
FIG. 4 is a block diagram illustrating a structure of a deep learning model performing super resolution imaging according to the exemplary embodiment of the present disclosure.

FIG. 4 is a block diagram illustrating a structure of the deep learning model performing super resolution imaging according to the exemplary embodiment of the present disclosure.

Referring to FIG. 4, the first model 200 for converting a high-resolution image to a low-resolution image according to the exemplary embodiment of the present disclosure may include a first-1 neural network 210 which receives a first image 21 and generates a low-resolution image corresponding to a second image 23, a first-2 neural network 220 which discriminates a low-resolution image 25 generated through the first-1 neural network 210 by using the second image 23 as GT, and a first-3 neural network 230 which adjusts elements related to a texture of the low-resolution image 25 generated through the first-1 neural network 210 by using the second image 23 as GT. In this case, a content of the first image 21 may not correspond to a content of the second image 23. Further, the first image 21 may be a high-resolution image compared to the second image 23.

The first-1 neural network 210 may receive the first image 21 and generate a third image 25 that is a low-resolution image close to the second image 23. The first-1 neural network 210 may convert the resolution of the first image 21 from the high resolution to the lower resolution based on the second image 23. For example, the first-1 neural network 210 may be understood as a generator of the GAN adjusting the resolution of the first image 21. Therefore, the first-1 neural network 210 aims to generate the third image 25 close to the resolution of the second image 23 so that it is difficult for the first-2 neural network 220, which is to be described below, to distinguish the second image 23 and the third image 25. That is, the first-1 neural network 210 may be trained to generate the third image 25 corresponding to the second image 23 from the first image 21 through a competition with the first-2 neural network 220.

The first-2 neural network 220 may receive the third image 25 and determine whether the third image 25 is the second image 23 or the low-resolution image generated by the first-1 neural network 210. For example, the first-2 neural network 220 may be understood as a discriminator of the GAN identifying the third image 25 based on the second image 23. Accordingly, the first-2 neural network 220 aims to discriminate the third image 25 generated by the first-1 neural network 210 and the second image 23 that is the GT or accurately determine how close the third image 25 is to the second image 23 that is the GT. That is, the first-2 neural network 220 may be trained so as to determine whether the third image 25 is the image generated through the first-1 neural network 210 through the competition with the first-1 neural network 210 or the second image 23.

The first-3 neural network 230 may receive the third image 25 and improve the factors, such as contrast and sharpness, related to the texture of the third image 25. The first-3 neural network 230 may serve to improve the factors affecting the texture, such as brightness of the third image 25 and an edge of an object expressed in the image, and generate a final output image of the first model 200. For example, the first-3 neural network 230 may include a Visual Geometry Group (VGG) neural network including a plurality of convolutional layers. However, the kind of neural network included in the first-3 neural network 230 is one example, and may be variously changed within the range that those skilled in the art can understand.

In the meantime, the first model 200 may further include an interpolation module 240 for down-sampling the first image 21. The interpolation module 240 may generate a GT image for the comparison with the third image 25 through the down-sampling of the first image 21. That is, the interpolation module 240 may generate a GT image for training the first-1 neural network 210 by performing the down sampling of degrading the resolution of the first image 21. For example, the interpolation module 240 may generate a GT image for the comparison with the third image 25 from the first image 21 through bicubic down sampling. In addition to the bicubic down sampling, various down sampling methods for degrading the resolution of the first image 21 may be applied to the interpolation module 240.

The first model 200 may be trained based on a first-1 loss function that calculates a pixel distance between the GT image generated through the interpolation module 240 and the third image 25 that is the low-resolution image generated through the first-1 neural network 210. The first-1 loss function may be the function for calculating a distance between two images that are targets for comparison in a pixel space. That is, the first-1 loss function may be the function for minimizing the pixel distance by using the pixel values of the first image down-sampled through the interpolation module 240 and the third image 25 as input variables. Through the foregoing first-1 loss function, performance of the first-1 neural network 210 may be improved.

The first model 200 may be trained based on a first-2 loss function that calculates a difference in a gram matrix between the third image 25 that is the low-resolution image generated through the first-1 neural network 210 and the second image 23. The first-2 loss function may be the function for minimizing a distance between two gram matrixes by using a gram matrix of a feature value of the third image 25 and a gram matrix of a feature value of the second image 23 corresponding to the GT as input variables. Herein, the gram matrix may be calculated based on a feature value derived from an intermediate layer of the first-2 neural network 220 that had received the third image 25 and the second image 23. For example, the gram matrix may be derived by calculating a ratio of a width and a length based on a channel of the feature value of the specific intermediate layer of the first-2 neural network 220 as represented in Equation 2 below.

$$G_j^{\Phi}(x)_{c,c'} = \frac{1}{(C_j H_j W_j)} \sum_{h=1}^{H_j} \sum_{w=1}^{W_j} \Phi_j(x)_{h,w,c} \Phi_j(x)_{h,w,c'}$$ [Equation 2]

Herein, c, c' are channels of the feature value, h is a length of the feature value, w is a width of the feature value, $\Phi j$ is a feature value of the $j^{th}$ layer of the first-2 neural network 220 (j is a natural number), and x is an input image of the first-2 neural network 220. That is, in order for the first-1 neural network 210 to better replicate the feature of the low-resolution second image 23, the first model 200 may be trained by using the gram matrix of the feature value derived from the intermediate layer, except for the input/output layer of the first-2 neural network 220, as the input variable of the first-2 loss function.

The first model 200 may be trained based on a first-3 loss function by using a discrimination result of the first-2 neural network 220 as an input variable. In this case, since the first-3 loss function uses the discrimination result of the first-2 neural network 220 as an input variable, the first-3 loss function may be defined in accordance with the discrimination method of the first-2 neural network 220. For example, the first-2 neural network 220 may discriminate whether the third image 25 is the second image 23 (that is, whether the third image 25 is the image replicated by the first-1 neural network 210 or not) or determine how close the third image 25 is to the second image 23 corresponding to the GT. The first-3 loss function may be determined in accordance with the discrimination method of the first-2 neural network 220 and used for the training of the first model 200. Through the foregoing first-3 loss function, performance of the first-2 neural network 220 may be improved.

The first model 200 may be trained based on a first-4 loss function that calculates a distance between the features of the input images derived through the first-3 neural network 230. The first-4 loss function may be the function for calculating a distance between two images that are targets for comparison in a feature space, not the pixel space like the first-1 loss function. That is, the first-4 loss function may be the function for minimizing the distance between the feature of the second image 23 that is the GT derived through the first-3 neural network 230 and the feature of the third image 25 derived through the first-3 neural network 230. For example, when the first-3 neural network 230 is a VGG neural network, the first-4 loss function may include a perceptual loss function that uses the features derived through the VGG neural network as input variables. However, the type of function included in the first-4 loss function is merely an example, and may be variously changed within the range that those skilled in the art can understand.

The first model 200 may perform the training based on the combination of the four loss functions. For example, the first model 200 may be trained based on a loss function combined through a weighted sum of the first-1 loss function, the first-2 loss function, the first-3 loss function, and the first-4 loss function. The first model 200 aims to generate the low-resolution image corresponding to the second image 23 that is unpaired with the first image 21 by degrading the resolution of the first image 21. Therefore, in order to appropriately perform the resolution degrading operation according to the aim, the first model 200 may be trained through the combination of the four loss functions.

Referring to FIG. 4, the second model 300 for converting a low-resolution image to a high-resolution image according to the exemplary embodiment of the present disclosure may include a second-1 neural network 310 which receives an output image of the first model 200 and generates a high-resolution image corresponding to the first image 21, a second-2 neural network 320 which discriminates a high-resolution image generated through the second-1 neural network 310 by using the first image 21 as GT, and a second-3 neural network 330 which adjusts elements related to a texture of the high-resolution image generated through the second-1 neural network 310 by using the first image 21 as GT. In this case, the output image of the first model 200 may be the third image 25 generated by the first-1 neural network 210 to which the first image 21 is input.

The second-1 neural network 310 may receive the third image 25 and generate a fourth image 27 that is a high-resolution image close to the first image 21. The second-1 neural network 310 may convert the resolution of the third image 25 from low resolution from high resolution based on the first image 21. For example, the second-1 neural network 310 may be understood as a generator of the GAN adjusting the resolution of the third image 25. Therefore, the second-1 neural network 310 aims to generate the fourth image 27 close to the resolution of the first image 21 so that it is difficult for the second-2 neural network 320 which is to be described below to discriminate the first image 21 and the fourth image 27. That is, the second-1 neural network 310 may be trained to generate the fourth image 27 corresponding to the first image 21 from the third image 25 through competition with the second-2 neural network 320.

The second-2 neural network 320 may receive the fourth image 27 and determine whether the fourth image 27 is the first image 21 or the high-resolution image generated by the second-1 neural network 310. For example, the second-2 neural network 320 may be understood as a discriminator of the GAN identifying the fourth image 27 based on the first image 21. Accordingly, the second-2 neural network 320 aims to discriminate the fourth image 27 generated by the second-1 neural network 310 and the first image 21 that is the GT or accurately determine how close the fourth image 27 is to the first image 21 that is the GT. That is, the second-2 neural network 320 may be trained so as to determine whether the fourth image 27 is the image generated through the second-1 neural network 310 through the competition with the second-1 neural network 310 or the first image 21.

The second-3 neural network 330 may receive the fourth image 27 and improve the factors, such as contrast and sharpness, related to the texture of the fourth image 27. The second-3 neural network 330 may serve to improve the factors affecting the texture, such as brightness of the fourth image 27 and an edge of an object expressed in the image, and generate a final output image of the second model 300. For example, the second-3 neural network 330 may include a Visual Geometry Group (VGG) neural network including a plurality of convolutional layers. However, the kind of neural network included in the second-3 neural network 330 is one example, and may be variously changed within the range that those skilled in the art can understand.

The second model 300 may be trained based on a second-1 loss function that calculates a pixel distance between the first image 21 and the fourth image 27 that is the high-resolution image generated through the second-1 neural network 310. The second-1 loss function may be the function for calculating a distance between two images that are targets for comparison in a pixel space. That is, the second-1 loss function may be the function for minimizing the pixel distance by using pixel values of the first image 21 and the fourth image 27 as input variables. Through the foregoing second-1 loss function, performance of the second-1 neural network 310 may be improved.

The second model 300 may be trained based on a second-2 loss function by using a discrimination result of the second-2 neural network 320 as an input variable. In this case, since the second-2 loss function uses the discrimination result of the second-2 loss neural network 320 as an input variable, the second-2 function may be defined in accordance with the discrimination method of the second-2 neural network 320. For example, the second-2 neural network 320 may discriminate whether the fourth image 27 is the first image 21 (that is, whether the fourth image 27 is the image replicated by the second-1 neural network 310 or not) or determine how close the fourth image 27 is to the first image 21 corresponding to the GT. The second-2 loss function may be determined in accordance with the discrimination method of the second-2 neural network 320 and used for the training of the second model 300. Through the foregoing second-2 loss function, performance of the second-2 neural network 310 may be improved.

The second model 300 may be trained based on a second-3 loss function that calculates a distance between the features of the input images derived through the second-3 neural network 330. The second-3 loss function may be the function for calculating a distance between two images that are targets for comparison in a feature space, not the pixel space like the second-1 loss function. That is, the second-3 loss function may be the function for minimizing the distance between the feature of the first image 21 that is the GT derived through the second-3 neural network 330 and the feature of the fourth image 27 derived through the second-3 neural network 330. For example, when the second-3 neural network 330 is a VGG neural network, the second-3 loss function may include a perceptual loss function that uses the features derived through the VGG neural network as input variables. However, the type of function included in the second-3 loss function is merely an example, and may be variously changed within the range that those skilled in the art can understand.

The second model 300 may be trained based on the combination of the three loss functions. For example, the second model 300 may be trained based on a loss function combined through a weighted sum of the second-1 loss function, the second-2 loss function, and the second-3 loss function. The second model 300 aims to generate the high-resolution image corresponding to the first image 21 that is unpaired with the second image 23 by improving the resolution of the third image 25 generated through the first model 200. Therefore, the second model 300 may be trained through the combination of the three loss functions so as to appropriately perform the resolution improving operation according to the purpose.

In the meantime, in consideration of the input/output relation of the respective neural networks illustrated in FIG. 4, the first model 200 and the second model 300 may be understood to have a connection structure of end-to-end. That is, the deep learning model according to the exemplary embodiment of the present disclosure may have the end-to-end structure in which the output of the first model 200 degrading resolution is connected to the input of the second model 300 increasing the resolution based on the images that are unpaired because of including no corresponding contents. By using the deep learning model including the first model 200 and the second model 300 connected in the end-to-end structure, the processor 110 may perform super resolution imaging based on the plurality of images which are unpaired and has difference in resolution.

Figure 5:
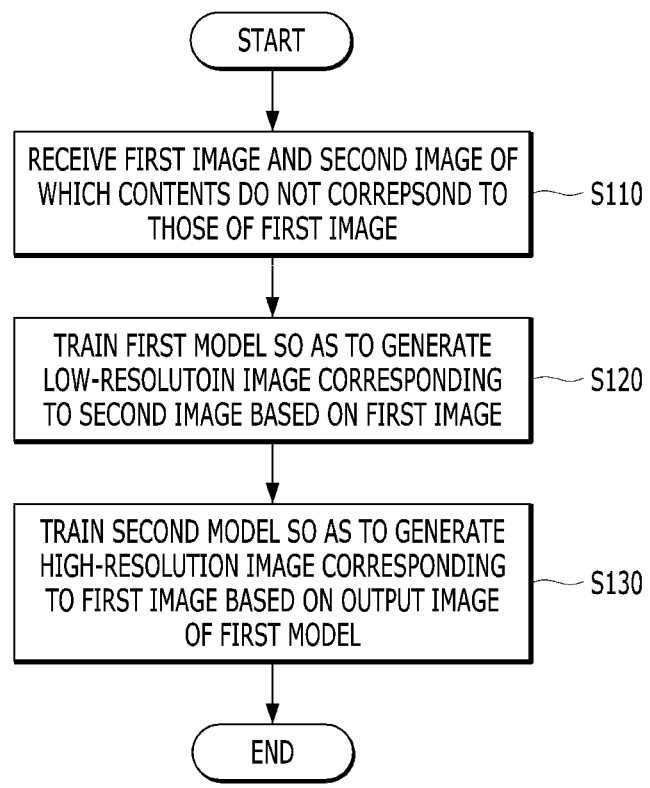
FIG. 5 is a flowchart illustrating a process of training a deep learning model of the computing device according to the exemplary embodiment of the present disclosure.

FIG. 5 is a flowchart illustrating a process of training a deep learning model of the computing device according to the exemplary embodiment of the present disclosure.

Referring to FIG. 5, in operation S110, the computing device 100 according to the exemplary embodiment of the present disclosure may receive an image set including a plurality of images of which contents do not correspond to each other from an external system. In this case, the plurality of images included in the image set may be the images having different resolution. For example, the computing device 100 may receive the image set including a first image and a second image that is a low-resolution image compared to the first image from a database server. The image set transmitted to the computing device 100 may be used for training the deep learning model for performing super resolution imaging in a subsequent operation.

In operation S120, the computing device 100 may train a first model included in the deep learning model so as to adjust resolution of the high-resolution image among the plurality of images included in the image set. The computing device 100 may train the first model so as to degrade the resolution of the high-resolution image based on a low-resolution image that is unpaired with the high-resolution image. For example, the computing device 100 may train the first model so that the first model receives the first image and generates the low-resolution image corresponding to the second image. In this case, a content of the first image does not correspond to a content of the second image.

In operation S130, the computing device 100 may train a second model included in the deep learning model so as to adjust resolution of the low-resolution image generated through the first model. The computing device 100 may train the second model so as to improve the low-resolution image generated through the first model to high resolution. In this case, the second model may be connected with the first model by end-to-end. For example, the computing device 100 may train the second model so that the second model receives an output image of the first model and generates a high-resolution image corresponding to the first image. That is, the computing device 100 may train the second model so that the second model generates the high-resolution image that may be paired with the second image from the output image of the first model which had been received the first image.

Figure 6:
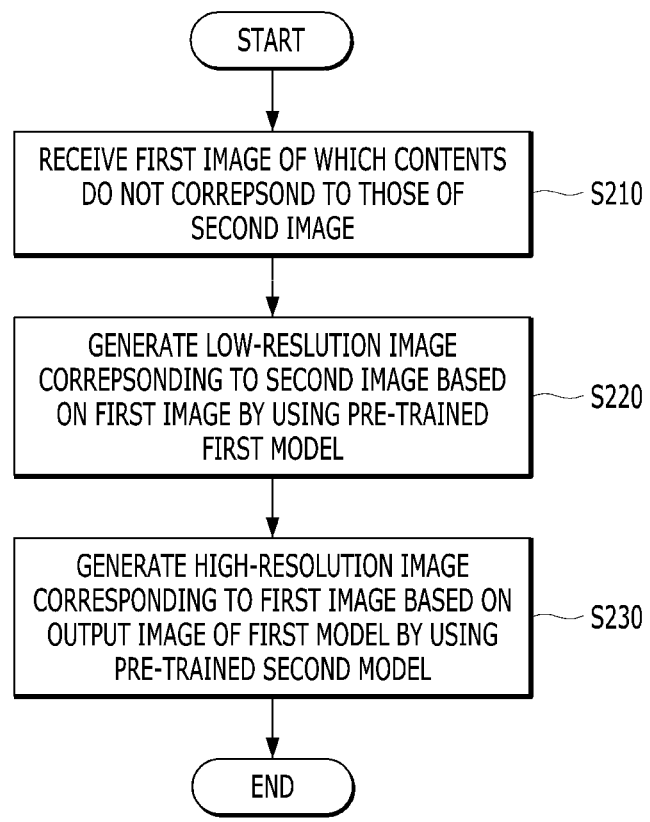
FIG. 6 is a flowchart illustrating a super resolution imaging process of the computing device according to the exemplary embodiment of the present disclosure.

FIG. 6 is a flowchart illustrating a super resolution imaging process of the computing device according to the exemplary embodiment of the present disclosure.

Referring to FIG. 6, in operation S210, the computing device 100 according to the exemplary embodiment of the present disclosure may receive a high-resolution image of which a content does not correspond to that of a low-resolution image that is a criteria for performing super resolution imaging. The computing device 100 may receive a high-resolution image that is unpaired with a low-resolution image used as GT of the training of the deep learning model pre-trained through the process of FIG. 5 from an external system. For example, the computing device 100 may receive a first image that is a high-resolution image compared to a second image used as the GT for training the deep learning model from a database server. The first image transmitted to the computing device 100 may be used for an inference operation of the deep learning model for performing super resolution imaging in a subsequent operation.

In operation S220, the computing device 100 may generate a low-resolution image corresponding to the image used as the GT of the training of the first model based on the high-resolution image received in operation S210 by using the pre-trained first model. For example, the computing device 100 may generate a low-resolution image corresponding to the second image by inputting the first image to the pre-trained first model. That is, the computing device 100 may generate a low-resolution image that may be paired with the second image from the first image which has a content that does not correspond to a content of the second image and has high resolution through the first model.

In operation S230, the computing device 100 may generate a high-resolution image corresponding to the high-resolution image received in operation S210 based on the low-resolution image generated in operation S220 by using the pre-trained second model. For example, the computing device 100 may generate a high-resolution image corresponding to the first image by inputting the low-resolution image generated through the first model to the pre-trained second model. That is, the computing device 100 may generate a high-resolution image that may be paired with the second image from the low-resolution image that may be paired with the second image through the second model. Through the foregoing process, the computing device 100 may effectively perform the super resolution imaging based on the images which are unpaired and have different resolution.

Figure 7:
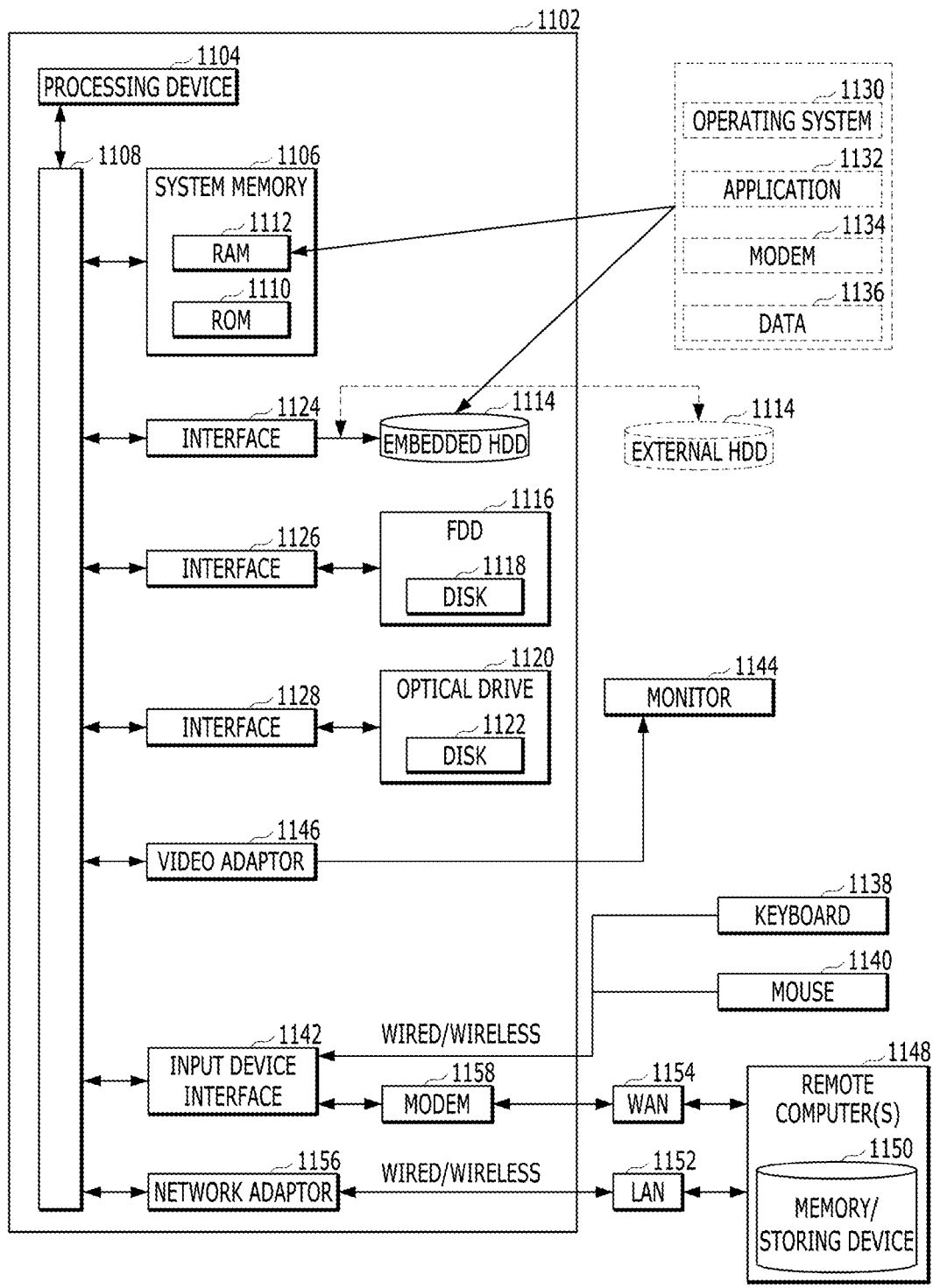
FIG. 7 is a schematic diagram of a computing environment according to the exemplary embodiment of the present disclosure.

FIG. 7 is a simple and general schematic diagram of an example of a computing environment in which the exemplary embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an exterior mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

In the meantime, according to an exemplary embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of pieces of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include data pre-processed by the processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structuer including the neural network may be configured with all or a combination of data pre-processed for processing by the neural network, data input to the neural network, a weight of the neural network, a hyper parameter of the neural network, data obtained from the neural network, an active function associated with each node or layer of the neural network, a loss function for training the neural network, and the like. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons". The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network. (in the present specification, weights and parameters may be used with the same meaning.) Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

What is claimed is:

1. A method of super resolution imaging based on deep learning performed by a computing device including at least one processor, the method comprising:
   receiving a first image and a second image having low resolution compared to the first image;
   training a first model including a first-1 neural network which receives the first image and generates a low-resolution image corresponding to the second image so as to generate the low-resolution image corresponding to the second image based on the first image, and a first-2 neural network which discriminates the low-resolution image generated through the first-1 neural network by using the second image as Ground Truth (GT); and
   training a second model so as to generate a high-resolution image corresponding to the first image based on an output image of the first model,
   wherein the first model is trained based on a first-2 loss function that calculates a difference in a gram matrix between the low-resolution image generated through the first-1 neural network and the second image;
   the gram matrix is calculated based on a feature value derived from an intermediate layer of the first-2 neural network, and
   contents of the first image do not correspond to contents of the second image.

2. The method of claim 1, wherein the first model further includes a first-3 neural network which adjusts factors related to a texture of the low-resolution image generated through the first-1 neural network by using the second image as the GT.

3. The method of claim 2, wherein the first model further includes an interpolation module for down sampling the first image.

4. The method of claim 3, wherein the first model is trained based on a first-1 loss function that calculates a pixel distance between the first image down-sampled through the interpolation module and the low-resolution image generated through the first-1 neural network.

5. The method of claim 1, wherein the second model includes:
   a second-1 neural network which receives an output image of the first model and generates a high-resolution image corresponding to the first image;
   a second-2 neural network which discriminates the high-resolution image generated through the second-1 neural network by using the first image as the GT; and
   a second-3 neural network which adjusts factors related to a texture of the high-resolution image generated through the second-1 neural network by using the first image as the GT.

6. The method of claim 5, wherein the second model is trained based on a second-1 loss function that calculates a pixel distance between the first image and the high-resolution image generated through the second-1 neural network.

7. A method of super resolution imaging based on deep learning performed by a computing device including at least one processor, the method comprising:
   generating a low-resolution image corresponding to a second image based on a high-resolution first image compared to the second image by using a pre-trained first model including a first-1 neural network which receives the first image and generates the low-resolution image corresponding to the second image and a first-2 neural network which discriminates the low-resolution image generated through the first-1 neural network by using the second image as a Ground Truth (GT); and
   generating a high-resolution image corresponding to the first image based on an output image of the first model by using a pre-trained second model,
   wherein the first model is trained based on a first-2 loss function that calculates a difference in a gram matrix between the low-resolution image generated through the first-1 neural network and the second image;
   the gram matrix is calculated based on a feature value derived from an intermediate layer of the first-2 neural network, and
   contents of the first image do not correspond to contents of the second image.

8. A computer program stored in a non-transitory computer readable storage medium, wherein when the computer program is executed by one or more processors, the computer program performs following operations for performing super resolution imaging based on deep learning, the operations comprising:
   receiving a first image and a second image of low resolution compared to the first image;
   training a first model including a first-1 neural network which receives the first image and generates a low-resolution image corresponding to the second image so as to generate the low-resolution image corresponding to the second image based on the first image, and a first-2 neural network which discriminates the low-resolution image generated through the first-1 neural network by using the second image as Ground Truth (GT); and
   training a second model so as to generate a high-resolution image corresponding to the first image based on an output image of the first model,
   wherein the first model is trained based on a first-2 loss function that calculates a difference in a gram matrix between the low-resolution image generated through the first-1 neural network and the second image;
   the gram matrix is calculated based on a feature value derived from an intermediate layer of the first-2 neural network, and
   contents of the first image do not correspond to contents of the second image.

9. A computing device performing super resolution imaging based on deep learning, the computing device comprising:
   a processor including at least one core;

a memory including program codes executable in the processor; and a network interface configured to receive an image, wherein the processor trains a first model including a first-1 neural network which receives the first image and generates a low-resolution image corresponding to the second image so as to generate the low-resolution image corresponding to the second image based on the high-resolution first image compared to the second image, and a first-2 neural network which discriminates the low-resolution image generated through the first-1 neural network by using the second image as Ground Truth (GT), and trains a second model so as to generate a high-resolution image corresponding to the first image based on an output image of the first model, and the first model is trained based on a first-2 loss function that calculates a difference in a gram matrix between the low-resolution image generated through the first-1 neural network and the second image;

the gram matrix is calculated based on a feature value derived from an intermediate layer of the first-2 neural network, and contents of the first image do not correspond to contents of the second image.

10. A non-transitory computer-readable recording medium in which a data structure corresponding to a parameter of a neural network of which at least a part is updated during a training process is stored, wherein an operation of the neural network is at least partially based on the parameter, and the training process comprises:

receiving a first image and a second image having low resolution compared to the first image;

training a first model including a first-1 neural network which receives the first image and generates a low-resolution image corresponding to the second image so as to generate the low-resolution image corresponding to the second image based on the first image, and a first-2 neural network which discriminates the low-resolution image generated through the first-1 neural network by using the second image as Ground Truth (GT); and training a second model so as to generate a high-resolution image corresponding to the first image based on an output image of the first model, the first model is trained based on a first-2 loss function that calculates a difference in a gram matrix between the low-resolution image generated through the first-1 neural network and the second image;

the gram matrix is calculated based on a feature value derived from an intermediate layer of the first-2 neural network, and contents of the first image do not correspond to contents of the second image.

* * * * *